W. RANDALL.
STRAW SPREADER.
APPLICATION FILED JUNE 30, 1914.

1,255,052. Patented Jan. 29, 1918.
5 SHEETS—SHEET 1.

Inventor
W. Randall

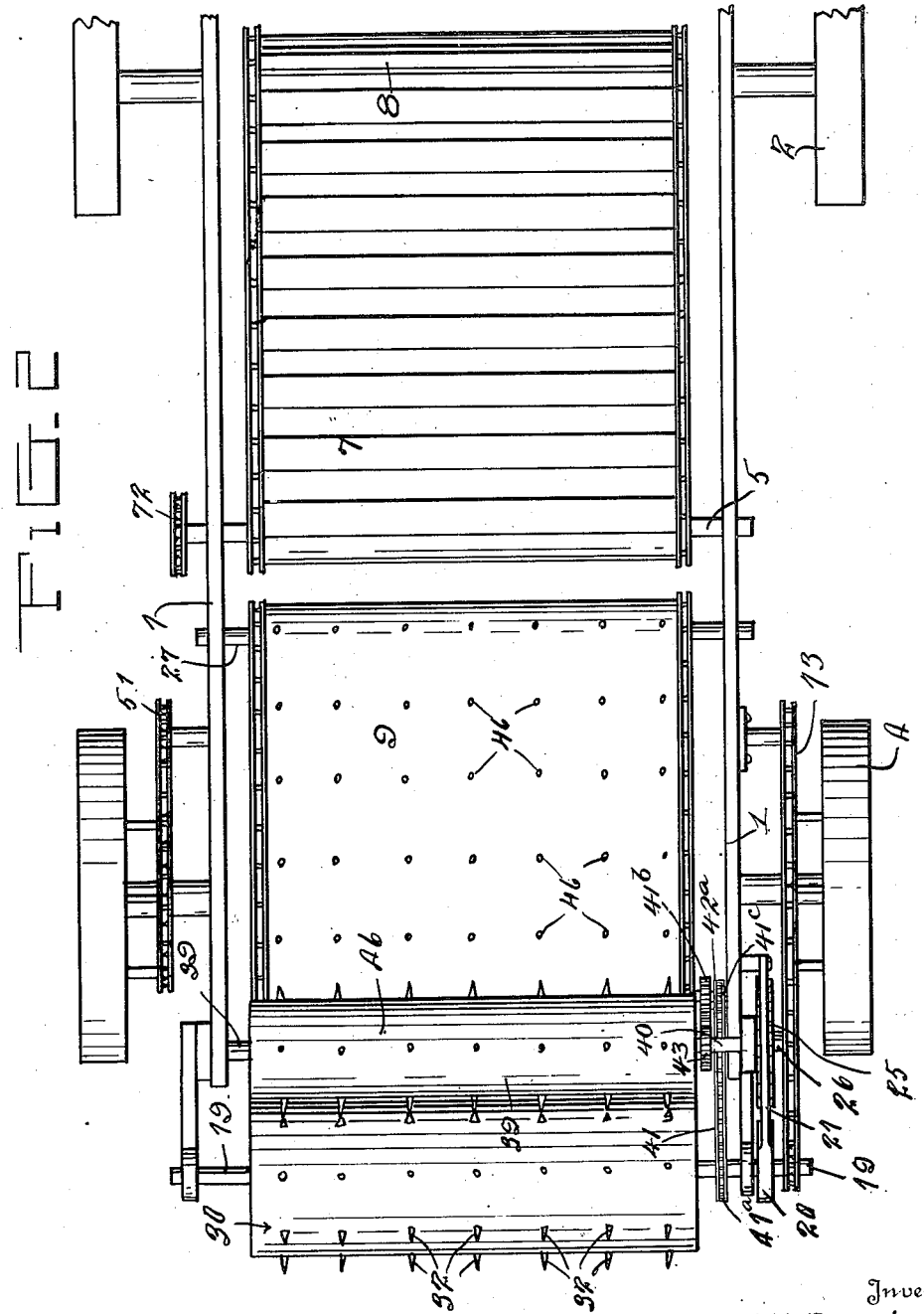

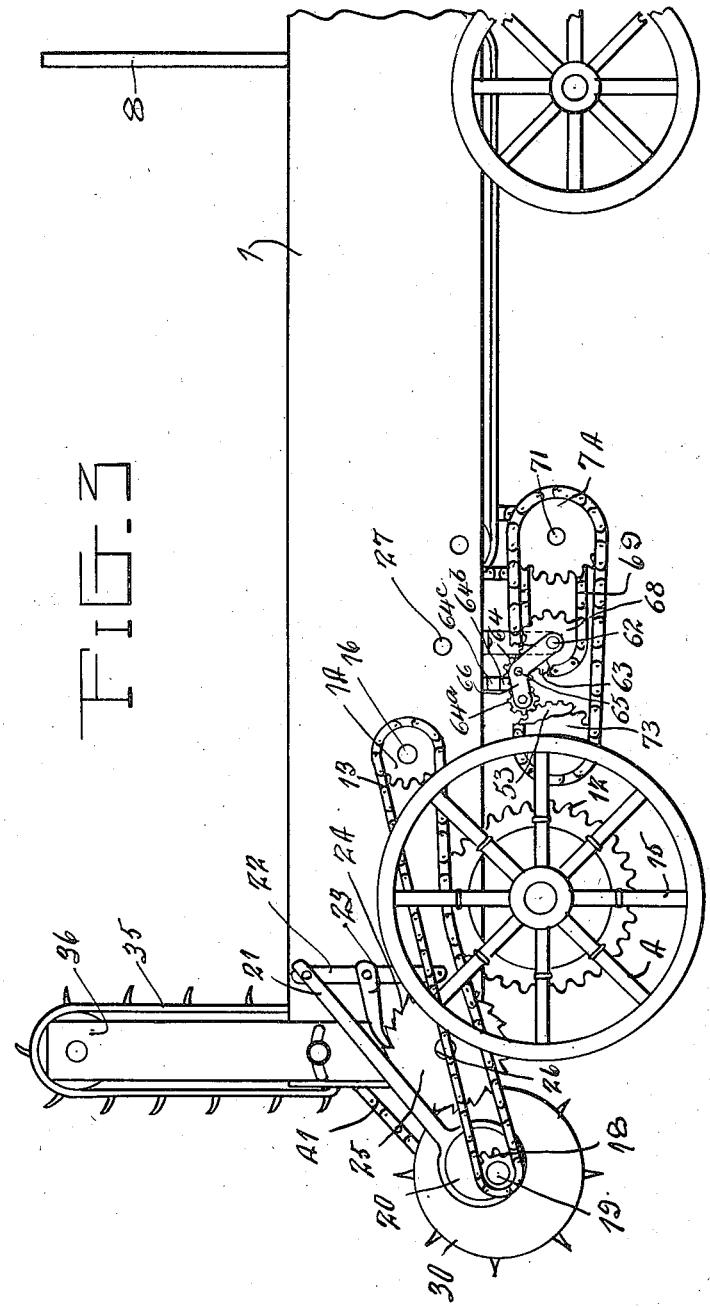

W. RANDALL.
STRAW SPREADER.
APPLICATION FILED JUNE 30, 1914.
1,255,052.
Patented Jan. 29, 1918.
5 SHEETS—SHEET 4.
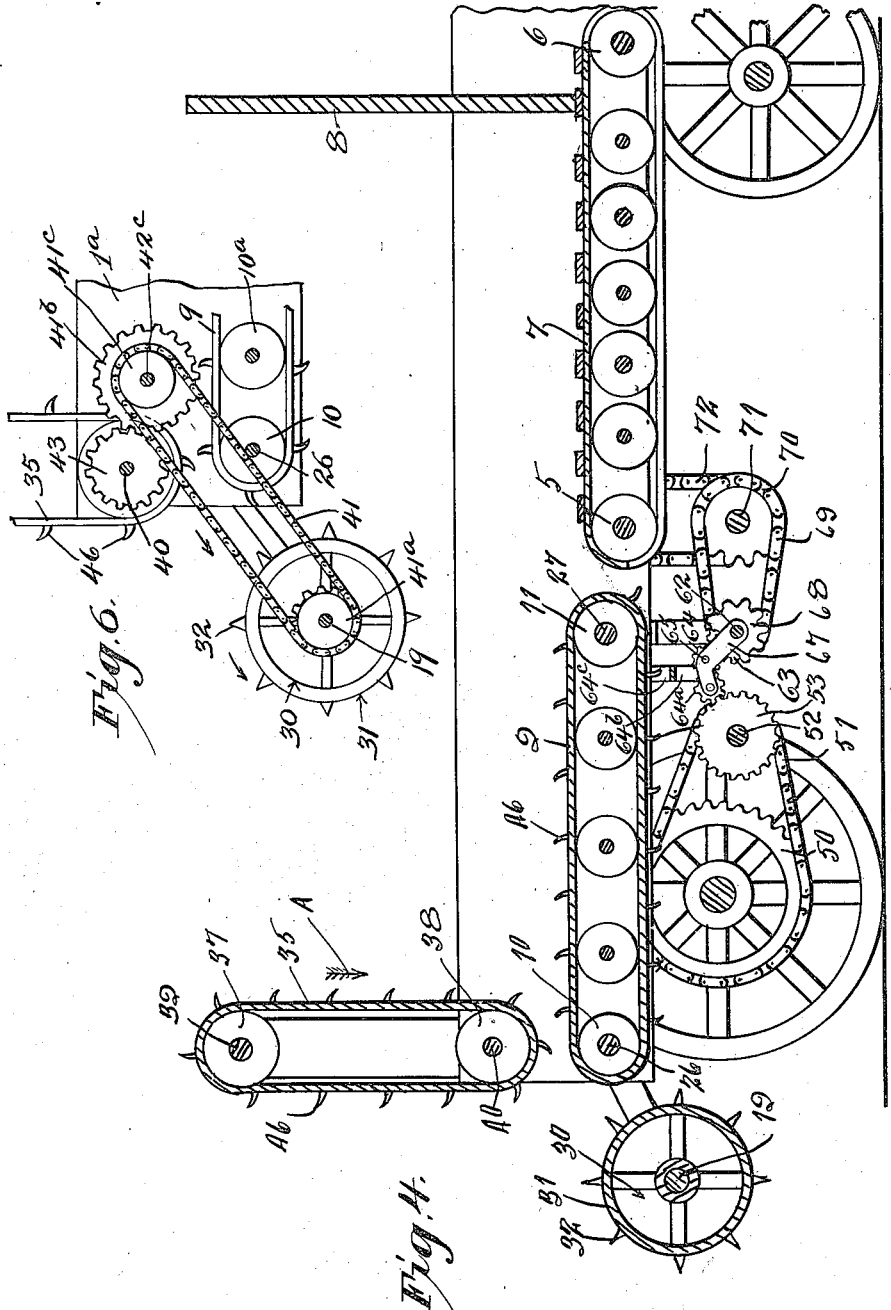
Inventor
W. Randall
Witnesses
Chas. H. Trotter
Robt. Meyer
By 
Attorney

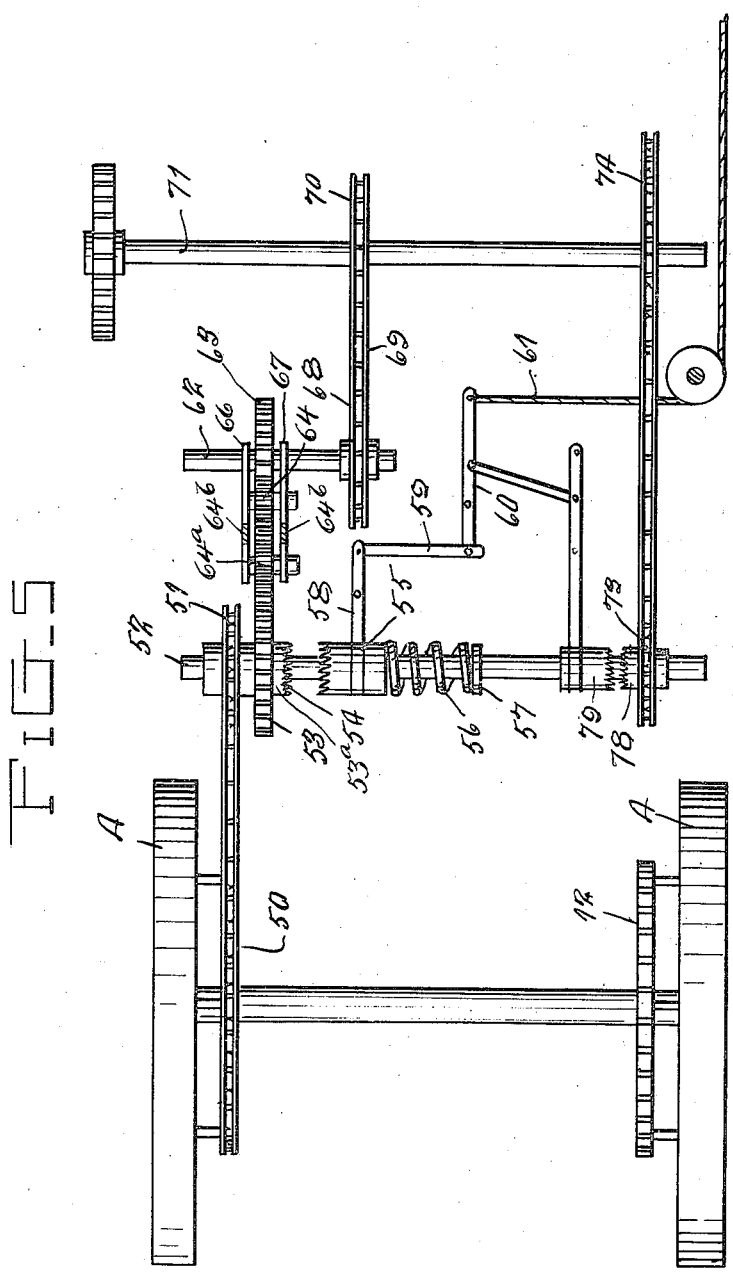

UNITED STATES PATENT OFFICE.

WELLINGTON RANDALL, OF MARYSVILLE, WASHINGTON.

STRAW-SPREADER.

1,255,052.

Specification of Letters Patent.

Patented Jan. 29, 1918.

Application filed June 30, 1914. Serial No. 848,214.

*To all whom it may concern:*

Be it known that I, WELLINGTON RANDALL, a citizen of the United States, residing at Marysville, in the county of Snohomish and State of Washington, have invented certain new and useful Improvements in Straw-Spreaders; and I do hereby declare the following to be a full, clear, and exact description of the invention, such as will enable others skilled in the art to which it appertains to make and use the same.

This invention relates to agricultural implements and more particularly to a device for scattering or spreading manure or fertilizer such as straw, spoiled hay, or the like.

The primary object of the invention is the provision of a vehicle body constructed similar to the construction of an ordinary farm wagon, which has a plurality of conveyers carried thereby and operable by the traction of the wagon, for carrying the straw from one end of the wagon bed and depositing it upon a scattering roller, so as to efficiently unload the load and scatter the hay or straw over the field.

Another object is to automatically feed the straw from the forward end of the vehicle frame to the rear end of the same from whence it is deposited upon the spreading roller.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Fig. 2 is a top plan view of the straw spreader,

Figure 1:
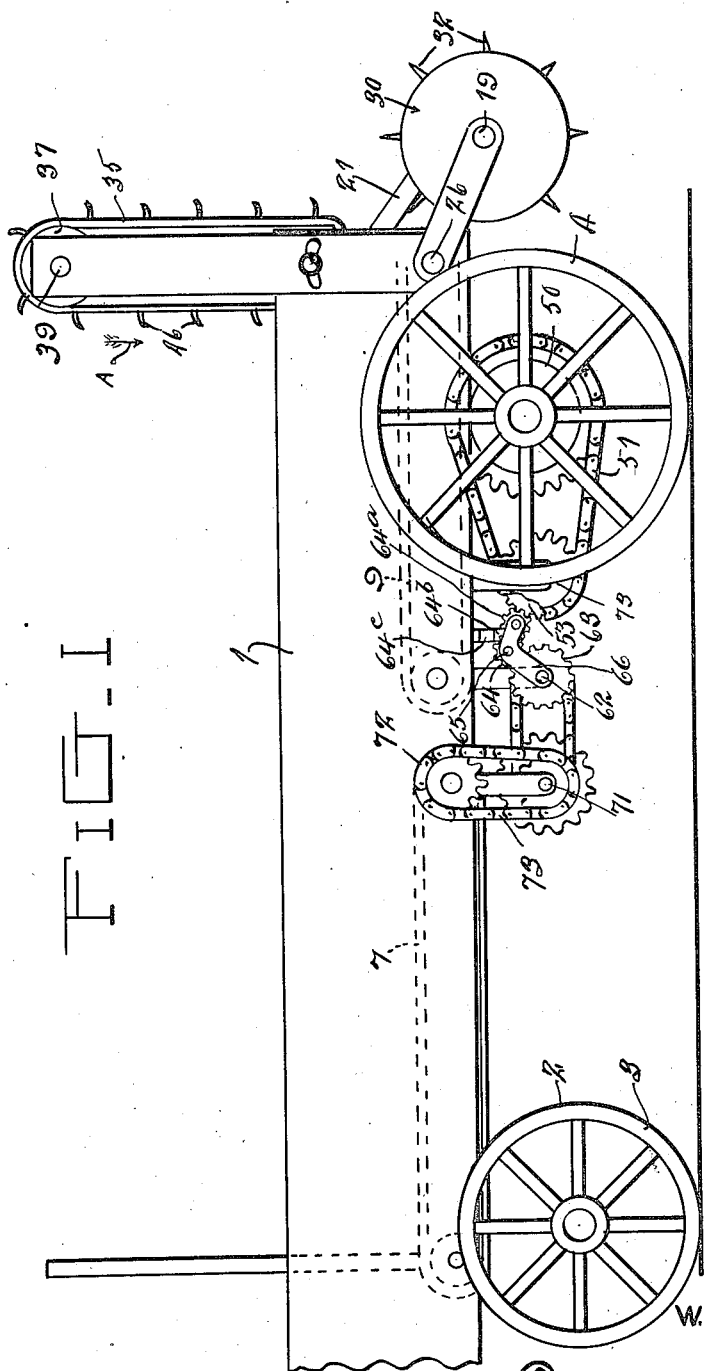
Figure 1 is a side elevation of the improved straw spreader.

Fig. 3 is a side elevation showing parts broken away from the spreader, exposing the side opposite to the one illustrated in Fig. 1 of the drawings, Fig. 4 is a central sectional view through the improved straw spreader, Fig. 5 is a plan view of the mechanism for repositioning the feeder of the machine, and Fig. 6 is a sectional view taken on the vertical plane indicated by the line 6—6 of Fig. 2, looking in the direction indicated by the arrow.

Referring to the drawings by reference characters, 1 and 1$^a$ designate the side boards of the body of a vehicle constructed in accordance with my invention. The body is mounted upon the usual type of running gear 2 which includes the front wheels 3 and the rear wheels 4.

Journaled on and between the side boards 1 and 1$^a$ are transversely arranged end rollers 5 and 6, and intermediate rollers 5$^a$. The roller 6 is positioned near the front end of the body, and the roller 5 is positioned near the transverse center of the body. A front conveyer belt 7 passes about the rollers 5, 5$^a$ and 6, and the upper run thereof is provided with a follower 8. The follower 8 rises vertically from the upper run of the conveyer belt 7, and it is moved rearwardly during the movement of the conveyer belt in one direction for a purpose which will be hereinafter fully set forth. A conveyer belt 9 is mounted upon end rollers 10 and 11 and intermediate rollers 10$^a$. The rollers 10, 11 and 10$^a$ are journaled on and located between the side boards 1 and 1$^a$, the rollers extend transversely of the body and are so positioned as to support the upper run of the conveyer belt 9 at a point above the upper run of the conveyer belt 7. The upper run of the conveyer belt 7 is provided with a plurality of slats or flights 7$^a$, and the conveyer belt 9 is provided with a plurality of teeth 46. Secured to the outer sides of the side boards 1 and 1$^a$ are vertical standards 36. These standards are located at the rear end of the body, and journaled in their upper ends is a transverse shaft 39 to which is keyed a roller 37. A shaft 40 to which is keyed a roller 38, is journaled in the side boards 1 and 1$^a$ and in the lower ends of the standards 36 at a point below the shaft 39. A belt 35, which is provided with a plurality of teeth 46 is mounted upon the rollers 37 and 38.

The conveyer belts 7 and 9 form the bottom, the follower 8 the front end, and the belt 35 the rear end of the body of the vehicle. The load of manure or other fertilizer is placed upon the conveyer belts 7 and 9 between the follower 8 and the belt 35.

A pair of bearing arms 19$^a$ are secured to the sides 1 and 1$^a$ at the rear of the body, and they extend downwardly and rearwardly from said end. A shaft 19 is journaled in the bearings of the arms 19ª, and mounted upon the shaft is a spreader which comprises a drum 31 and a plurality of fingers or prongs 32. The fingers or prongs 32 project radially from the outer surface of the drum 31. The spreader is driven from one of the rear wheels 4, and to accomplish this, the wheel has secured thereto a sprocket wheel 12 which meshes with the under run of a sprocket chain 13. The sprocket chain 13 passes about a sprocket wheel 18 keyed to the shaft 19 and about an idler sprocket wheel 14 which is journaled upon a shaft 16. The shaft 16 is secured to and projects laterally from the outer side of the side 1. The conveyer belt 9 is driven from the shaft 19 by means of an eccentric 20 keyed to the shaft 19, a rod 21 connected at one end to the eccentric strap 21ª, a lever 22 pivoted at its lower end, as at 22ª, to the outer side of the side board 1 and connected at its upper end to the free end of the rod 21, a pawl 23 pivotally connected to the lever 22 and a ratchet wheel 25. The ratchet wheel 25 is keyed to the shaft 26 upon which the end roller 10 of the conveyer belt 9 is mounted. The free end of the pawl 23 normally engages the ratchet teeth of the wheel 25. This structure is such that a slow intermittent feed or travel is imparted to the conveyer belt 9 during the movement of the vehicle and this movement of the conveyer belt 9 feeds the fertilizer to the distributer, the distributer spreading the fertilizer over the field.

The belt 35 has imparted thereto a slow continuous movement by a pinion 41ᵇ which meshes with a pinion 43 keyed to the shaft 40. The pinion 41ᵇ is journaled on a shaft 42ᶜ secured to the inside of the side board 1 and has secured thereto a sprocket wheel 41ᶜ which is operatively connected by means of a sprocket chain 41 to a sprocket wheel 41ª keyed to the shaft 19.

The conveyer belt 7 is adapted to be driven in two directions, that is, in a clockwise direction and a counter clockwise direction. The mechanism for driving the conveyer belt 7 is under the control of the operator, and when it is driven in a counter clockwise direction that portion of the load carried by the upper run of the belt is moved in the direction of the inner end of the conveyer belt 9. The follower 8 is fixed to and moves with the upper run of the conveyer belt 7, and it causes that portion of the load carried by the upper run to travel rearwardly when the belt is operated in a counter clockwise direction. The mechanism by which the conveyer belt 7 may be operated in a counter clockwise direction comprises a sprocket wheel 50 secured to the other of the rear wheels 4, a shaft 52 journaled at a point below the body of the vehicle, and a sprocket chain 51 which passes around the sprocket wheel 50 and around a sprocket wheel 53 keyed to the shaft 52. A gear wheel 53ᵇ is journaled upon the shaft 52, and the hub 53ª thereof is provided with a clutch face 54. A sliding clutch member 55 is splined to the shaft 52, and it is adapted to be moved into and out of engagement with the clutch face 54 for locking the gear wheel 53ᵇ to the shaft 52 or for releasing the gear wheel 53ᵇ. The clutch member 55 is held normally in engagement with the clutch face 54 by an expansive coil spring 56 mounted upon the shaft 52 between the clutch member 55 and a collar 57. The clutch member 55 may be moved out of engagement with the clutch face 54 and held out of engagement therewith when desired by means of a cable 61. One end of this cable is connected to a lever, not shown, which is adapted to be mounted upon the body of the vehicle near the driver's seat, and this lever may be provided with means to hold it in position to retain the clutch member 55 out of engagement with the clutch face 54. The cable 61 passes about a grooved pulley 61ª journaled on the underside of the body of the vehicle, and the other end thereof is secured to one end of a lever 60, which is pivoted at a point between its ends to the underside of the body of the vehicle. A forked lever 58 is also pivoted to the underside of the body of the vehicle at a point between its ends, and it is provided with a fork for engagement in a groove formed in the outer surface of the clutch member 55. The levers 60 and 58 are connected by a link 52. It should be seen that when a pull is exerted upon the cable 61, the clutch member 55 is moved out of engagement with the clutch face 54, and that when the cable 61 is released, the spring 56 will force the clutch element 55 into engagement with the clutch face 54. A stub shaft 62 is journaled on the underside of the body of the vehicle in advance of the shaft 52, and it has keyed thereto a gear wheel 63. A pair of arms 66 and 67, have openings through which the stub shaft 62 passes and are suitably supported from the underside of the body of the vehicle by means of a bracket 64ᵇ secured to a cross bar 64ᶜ. A pair of intermeshing pinions 64 and 64ª are journaled upon and between the arms 66 and 67. The pinion 64 is constantly in mesh with a gear wheel 63, and the pinion 64ª is constantly in mesh with the gear wheel 53. The manner in which the stub shaft 62 is geared up to the rear wheel 4 is such that the stub shaft is driven in a counter clockwise direction. A shaft 71, which is suitably journaled on the underside of the body of the vehicle, is driven in a counter clockwise direction from the stub shaft 62 by means of a sprocket chain 69. The sprocket chain 69 passes about a sprocket wheel 68 keyed to the stub shaft 62 and about a sprocket wheel 70 keyed to the shaft 71. The shaft 71 has keyed thereto a sprocket wheel 71$^a$, and a sprocket chain 72 passes about the sprocket wheel 71$^a$ and a sprocket wheel 73 keyed to the shaft 5$^b$ of the roller 5.

When it is desired to drive the conveyer belt 7 in a counter clockwise direction to feed the fertilizer to the inner end of the conveyer belt 9, the cable 61 is released. Immediately after this, the spring 56 forces the clutch member 55 into engagement with the clutch face 54, locking the gear wheel 53 to the shaft 52. The gear wheel 53 rotates the pinion 64$^a$ and the latter rotates the pinion 64. The pinion 64 rotates the shaft 62 through the gear wheel 63. The rotation of the shaft 62 rotates the shaft 71, and the rotation of the shaft 71 drives the conveyer belt 7 in a counter clockwise direction through the sprocket chain 72.

The conveyer belt 7 may be driven in a clockwise direction to return the follower 8 to its normal position after the load of fertilizer has been distributed by pulling on the flexible member or cable 61 which will move the clutch member 55 out of engagement with the clutch member 54 against the tension of the spring 56. The movement of the clutch member 54 will rock the levers 58, 59 and 60 which rocking movement will be imparted to a lever 73$^b$, by the arm 73$^c$. The lever 73$^b$ is connected to a clutch member 79 and it is pivoted as shown at 73$^d$ so that the rocking thereof by the outward movement of the clutch member 55 will move the clutch member 79 into engagement with a clutch member 78 which is carried by a sprocket 73$^e$. The sprocket 73$^e$ is loosely mounted upon the shaft 52, while the clutch member 79 is feathered thereon so that when the clutch members 78 and 79 are in engagement, the sprocket 73$^e$ will be rotated by the rotation of the shaft. A sprocket chain 74$^a$ travels about the sprocket 73 and about a sprocket 74 which is keyed to the shaft 71, whereby the shaft 71 will be rotated for returning the follower 8 to its normal position at the forward end of the distributer.

In practice, a load of fertilizer is placed upon the upper runs of the conveyer belts 7 and 9 between the follower 8 and the belt 35. The vehicle is then driven over the field, and the movement of the vehicle rotates the spreader 30 and drives the conveyer belt 9 in a counter clockwise direction. The movement of the vehicle also operates the belt 35 in the direction indicated by the arrow A of Fig. 4 of the drawings. That portion of the load of fertilizer carried by the upper run of the conveyer belt 9 is fed to the distributer by the teeth 46, and that portion of the load engaging the inner vertical run of the belt 35 is fed downwardly by the teeth 46$^a$. The teeth on the lower end of the belt 35 also feeds the fertilizer to the distributer 30, and the distributer 30 spreads the fertilizer evenly over the field. After that portion of the fertilizer which is supported by the upper run of the conveyer belt 9 has been distributed, the clutch member 55 is released so that its spring 56 will force it into engagement with face 54. As soon as this is done, the conveyer belt 7 is slowly driven in a counter clockwise direction, feeding that portion of the load supported by its upper run to the inner end of the conveyer belt 9, and the conveyer belt 9 feeds the fertilizer to the distributer 30. As the follower 8 is secured to and moves with the upper run of the conveyer belt 7, that portion of the load carried by the upper run of the conveyer belt is caused to follow the movement of the belt. After the entire load has been distributed, the clutch member 55 is drawn out of engagement with the clutch face 54, and the clutch member 79 is forced into engagement with the clutch face 79$^a$, resulting in the follower being returned to its normal position at the front end of the body of the vehicle. The vehicle may be again loaded and the fertilizer distributed.

Various changes may be made in the details of construction without departing from the spirit and scope of the invention as defined in the claims.

What is claimed is:—

1. A fertilizer distributer comprising a wheel supported vehicle body, side boards secured to the body, a front conveyer belt mounted between the side boards, a rear conveyer belt, between the side boards, a follower carried by the upper run of the front conveyer belt, a vertically disposed belt located at the rear end of the body above the rear conveyer belt, a distributer located at the rear end of the body, means for driving the rear conveyer belt, the vertical belt and the distributer, means by which the front conveyer belt may be driven in a clockwise or counter clockwise direction.

2. A fertilizer distributer comprising a wheel supported body, side boards secured to the body, a front conveyer belt located between the side boards, a rear conveyer belt located between the sides, a distributer located at the rear end of the body, a follower carried by the upper run of the front conveyer belt, means for driving the rear conveyer belt and distributer, and means by which the front conveyer belt may be driven in a clockwise or counter clockwise direction.

3. A manure spreader, a supporting frame having front and rear traction wheels, a horizontal conveyer carried by said frame, a vertical standard supported by said conveyer, a second horizontal conveyer carried by said frame and positioned in a slightly higher elevation than said first named conveyer, means for intermittently operating said second named conveyer by the traction wheels of said supporting frame for gradually feeding a load of straw from said frame, a rotary spreader suspended rearwardly from said supporting frame and operated by the traction of said frame, a vertical conveyer carried by said supporting frame and operable by the traction thereof for the feeding of the straw to said spreader, and means for reversing the direction of travel of the first named conveyer.

In testimony whereof I affix my signature in presence of two witnesses.

WELLINGTON RANDALL.

Witnesses:
E. E. COLVIN,
ELON UTLEY.